United States Patent
Dai et al.

(10) Patent No.: US 11,591,916 B2
(45) Date of Patent: Feb. 28, 2023

(54) RADIAL TURBINE ROTOR WITH COMPLEX COOLING CHANNELS AND METHOD OF MAKING SAME

(71) Applicant: Hamilton Sundstrand Corporation, Charlotte, NC (US)

(72) Inventors: Zhongtao Dai, West Hartford, CT (US); Ram Ranjan, West Hartford, CT (US); Robert H. Dold, Monson, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 98 days.

(21) Appl. No.: 17/366,493

(22) Filed: Jul. 2, 2021

(65) Prior Publication Data
US 2023/0003131 A1    Jan. 5, 2023

(51) Int. Cl.
| | |
|---|---|
| *F01D 5/18* | (2006.01) |
| *B33Y 80/00* | (2015.01) |
| *F01D 25/12* | (2006.01) |
| *B33Y 10/00* | (2015.01) |

(52) U.S. Cl.
CPC ............. *F01D 5/187* (2013.01); *B33Y 80/00* (2014.12); *F01D 5/186* (2013.01); *B33Y 10/00* (2014.12); *F01D 25/12* (2013.01); *F05D 2230/31* (2013.01); *F05D 2260/202* (2013.01); *F05D 2260/2212* (2013.01)

(58) Field of Classification Search
CPC . B22F 5/009; B22F 5/04; B33Y 10/00; B33Y 80/00; F05D 2260/2212; F05D 2260/202; F05D 2230/31; F01D 25/12; F01D 5/186; F01D 5/187
See application file for complete search history.

(56) References Cited

U.S. PATENT DOCUMENTS

| | | | | |
|---|---|---|---|---|
| 4,136,516 A | * | 1/1979 | Corsmeier | F01D 25/12 415/116 |
| 8,807,942 B2 | * | 8/2014 | Tibbott | F01D 5/085 416/193 A |
| 10,260,355 B2 | | 4/2019 | Smoke et al. | |
| 2014/0348664 A1 | * | 11/2014 | Jan | F01D 5/081 416/96 R |
| 2015/0037136 A1 | * | 2/2015 | Fairman | F16C 32/06 415/68 |

(Continued)

*Primary Examiner* — Courtney D Heinle
*Assistant Examiner* — Andrew Thanh Bui
(74) *Attorney, Agent, or Firm* — Carlson, Gaskey & Olds, P.C.

(57) ABSTRACT

A turbine rotor includes a base and a plurality of blades. The base and the blades curve such that radially outward portions of the base and the blades extend in a direction with a greater component in a radial direction than in an axial direction. Radially central portions of the base and the blade extend in a direction with the two components being closer. Radially inner sections of the base and the blades extend in a direction with a greater component in the axial direction than in a radial direction. There is a cooling channel arrangement in the turbine rotor. The cooling channel arrangement includes impingement cooling for a nose and serpentine passages for cooling sections of the platform circumferentially intermediate the blades, and distinct serpentine passages for cooling the plurality of blades. A turbomachine and method are also disclosed.

20 Claims, 7 Drawing Sheets

(56) References Cited

U.S. PATENT DOCUMENTS

| | | |
|---|---|---|
| 2017/0107821 A1 | 4/2017 | Schwarz |
| 2020/0263568 A1 | 8/2020 | Copeland et al. |
| 2020/0338639 A1 | 10/2020 | Friesth |
| 2020/0406354 A1 | 12/2020 | Zarandi et al. |

* cited by examiner

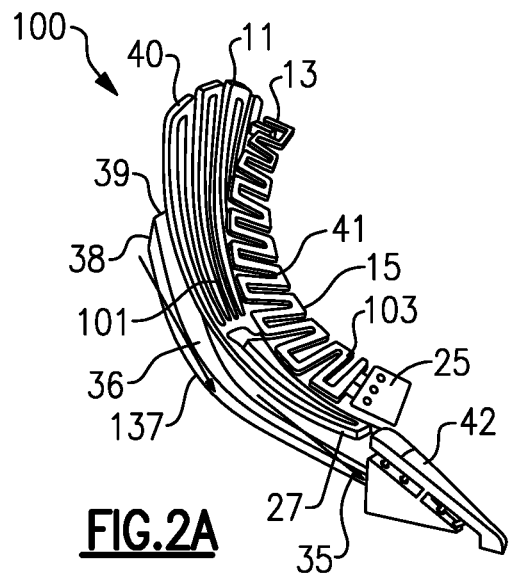
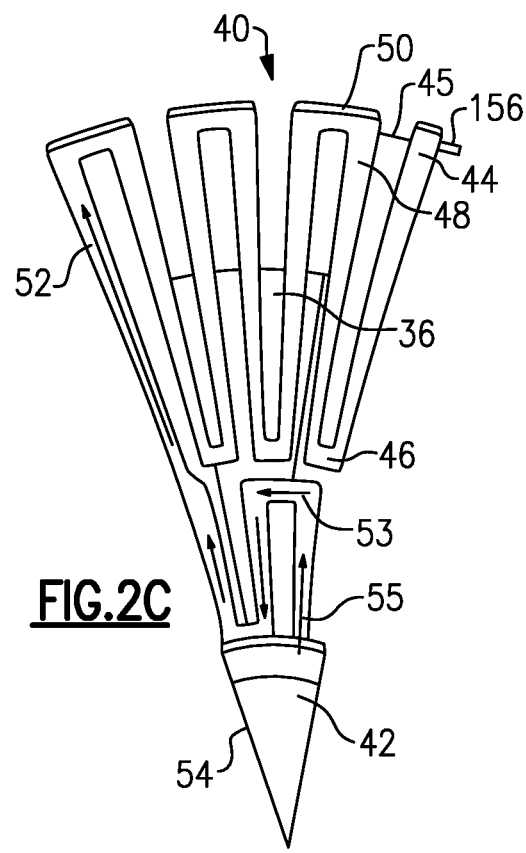
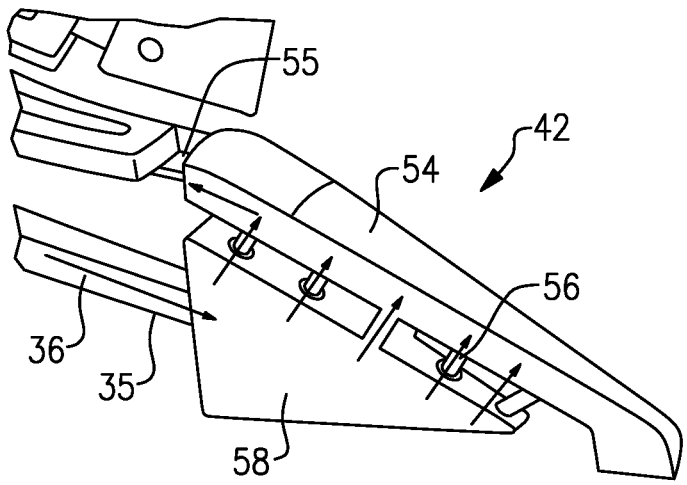
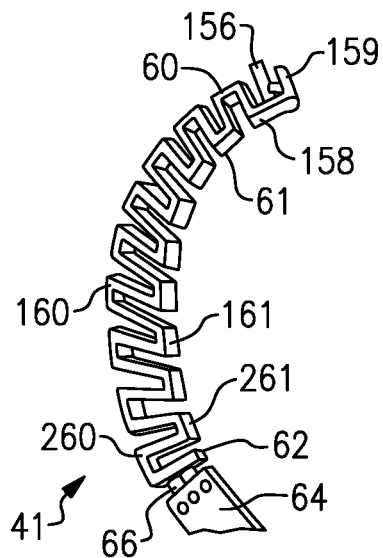
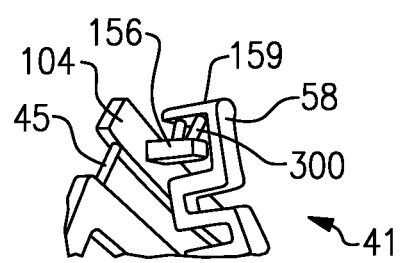

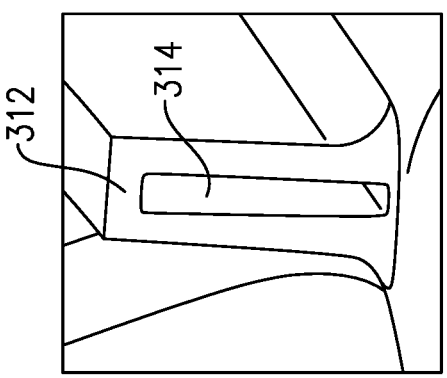
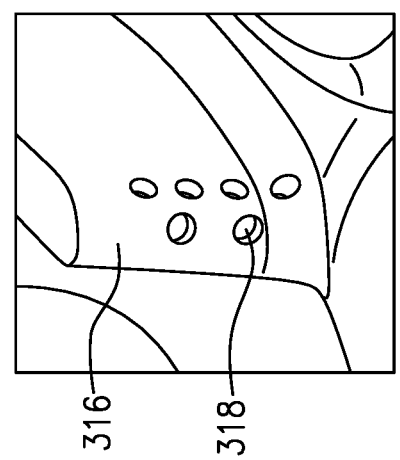
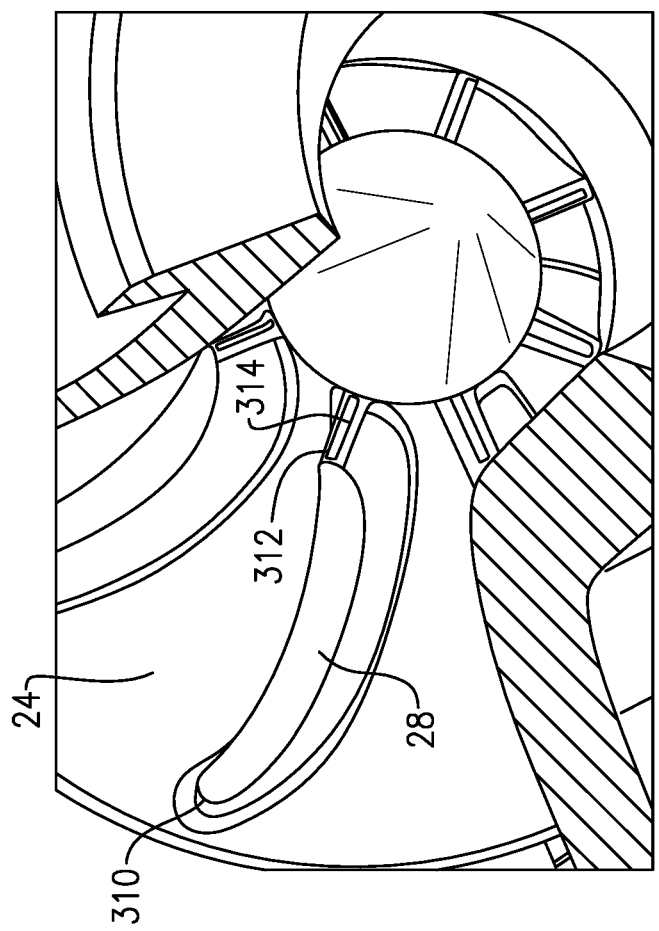

RADIAL TURBINE ROTOR WITH COMPLEX COOLING CHANNELS AND METHOD OF MAKING SAME

STATEMENT REGARDING FEDERALLY SPONSORED RESEARCH OR DEVELOPMENT

This invention was made with Government support under DE-EE0009138 awarded by the United States Department of Energy. The Government has certain rights in this invention.

BACKGROUND

This application relates to a radial turbine having an advanced cooling arrangement, and to a method of making a turbine with cooling channels.

Turbines are utilized in any number of applications, e.g., turbomachinery. One type of turbine is a so called radial turbine. A rotor for a radial turbine has a base and a plurality of blades extending radially outwardly of the base. A high pressure working fluid is delivered into a central area of the turbine from a volute, flows through a stator or nozzles, and expands as it contacts the turbine blades, driving the rotor to rotate. Downstream of the rotor the working fluid leaves a housing for the turbine through an outlet.

The efficiency of the turbomachinery depends on turbine inlet temperature and pressure. As the turbine inlet temperature increases, cooling of the turbine has been proposed. Turbine cooling fluid or coolant may be the same type of a fluid as turbine working fluid.

SUMMARY

A turbine rotor includes a base, with a plurality of blades extending radially outwardly of the base. A central nose is radially inward of the blade, defining a central axis of rotation. The base and the blades curve such that radially outward portions of the base and the blades extend in a direction with a greater component in a radial direction than in an axial direction. Radially central portions of the base and the blade extend in a direction with the two components being closer. Radially inner sections of the base and the blades extend in a direction with a greater component in the axial direction than in a radial direction. There is a cooling channel arrangement in the turbine rotor. The cooling channel arrangement includes backside impingement cooling for the nose and serpentine passages for cooling sections of the platform circumferentially intermediate the blades, and distinct serpentine passages for cooling the plurality of blades.

A turbomachine and method of forming a turbine rotor are also disclosed.

These and other features will be best understood from the following drawings and specification, the following is a brief description.

BRIEF DESCRIPTION OF THE DRAWINGS

FIG. 2A shows an arrangement of cooling channels within the thickness of one circumferential portion of the FIG. 1B rotor.
FIG. 2B shows a detail of FIG. 2A near a central area of the turbine rotor, and for cooling a nose of the turbine rotor.
FIG. 2C shows a detail of cooling channels for a base of the turbine, and in particular between the turbine blades.
FIG. 2D shows a cooling channel that is incorporated with the turbine blades to cool the turbine blades.
FIG. 2E shows detail of a connection between two cooling channels.
FIG. 4B shows cooling flow exit holes.
FIG. 4C shows one embodiment of the exit holes.
FIG. 4D shows a second embodiment.

DETAILED DESCRIPTION

Figure 1A:
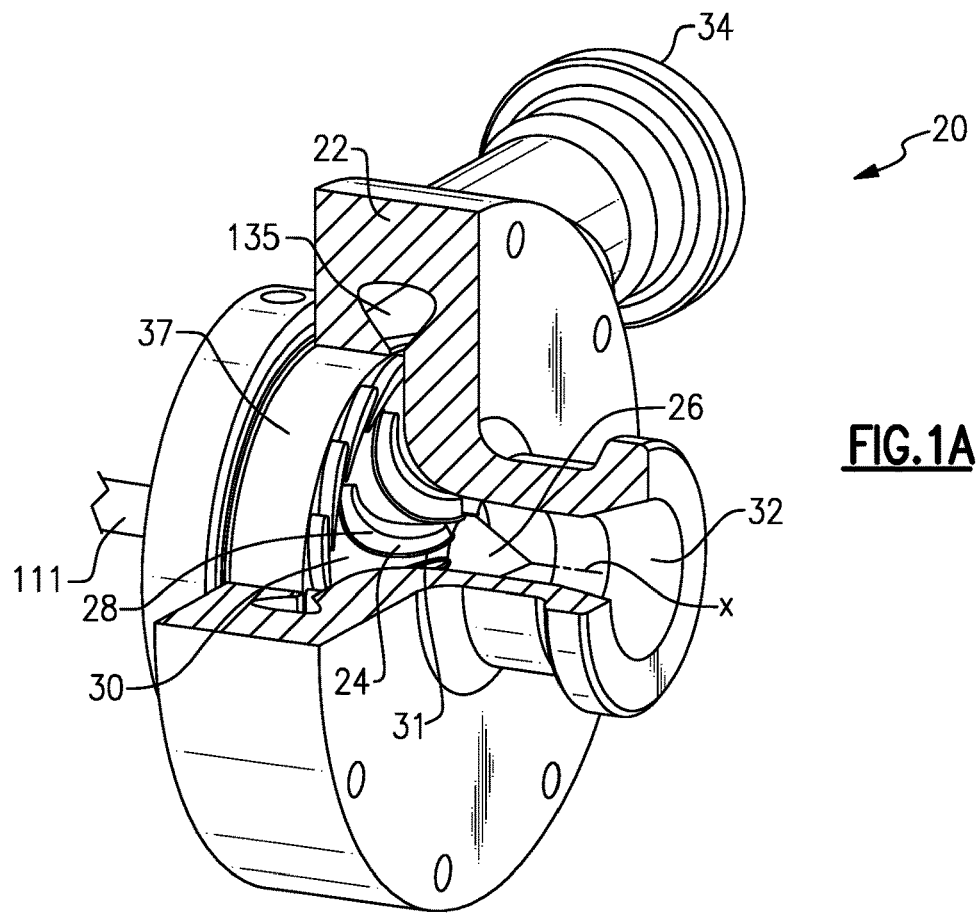
FIG. 1A shows a turbine rotor in a housing.

FIG. 1A shows a turbine and housing arrangement 20. A volute 22 houses a turbine rotor 24 along with a housing 37. The turbine rotor 24 has a base 30 with sections 31 intermediate a plurality of turbine blades 28. A nose cone 26 is formed at a center of the turbine rotor 24. High pressure fluid is delivered into an inlet 34 and passes out of opening 135, and impacts the blades 28, causing the rotor 24 to rotate. Downstream of the rotor the fluid exits through an outlet 32. The high pressure fluid drives the blades 28 such that the rotor 24 rotates about a central axis X along with shaft 111.

Figure 1B:
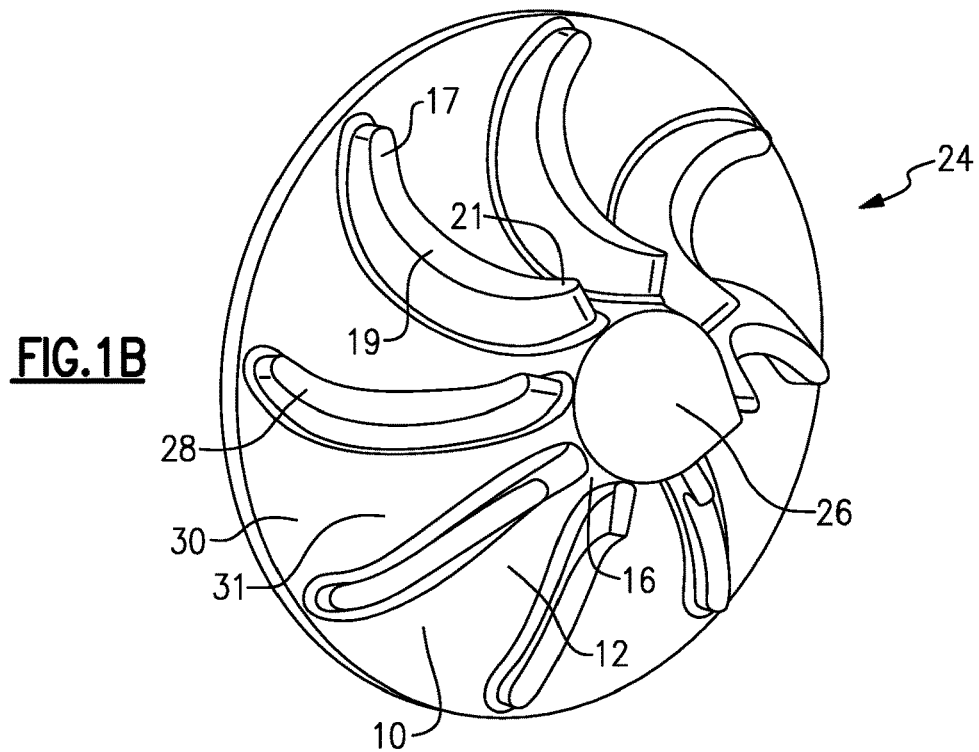
FIG. 1B shows the turbine rotor.

FIG. 1B shows details of the rotor 24. The base 30 and the sections 31 intermediate the blades 28 have radially outer sections 10 which curve into radially inner sections 16, with an intermediate section 12. The surfaces 31 extend in a direction that changes from section 10 to section 16. At section 10 the surface extends with a greater component in a radial direction than in an axial direction. In section 12 the two components get closer to each other. By section 16 the direction has a greater axial component than a radial component. A similar change occurs on the blades 28. As shown, a radially outer portion 17 of the blade curves through a central portion 19, and to an inner portion 21. Section 17 extends with a greater component in a radial direction than in an axial direction. Section 19 has the two components being closer to being equal. Section 21 extends with a greater component in an axial direction than in a radial direction.

The nose cone 26 as illustrated may be conical. Alternatively, it may be half spherical, half elliptic or other smooth bodies of revolution Applicant has recognized that there is a limit on the turbine inlet temperature that can be utilized with existing turbines. As an example, existing turbines may have a temperature limit of say approximately 800° C. The turbine inlet temperature has generally been limited by metal temperature capabilities from the metal forming the turbine rotor.

Active cooling of the turbine rotor has been proposed in the past. However, as can be appreciate, the turbine rotor 24 has a very complex shape. To adequately cool within the complex shape, including the curving sections 31 and blades 28, would be difficult with standard manufacturing techniques. As such, Applicant proposes to utilize additive manufacturing to form the turbine rotor 24, including embedded cooling channels. In addition, a thermal barrier coating may be used to further enhance turbine capability, e.g., turbine inlet temperature 1400° C. or above.

Figure 1C:
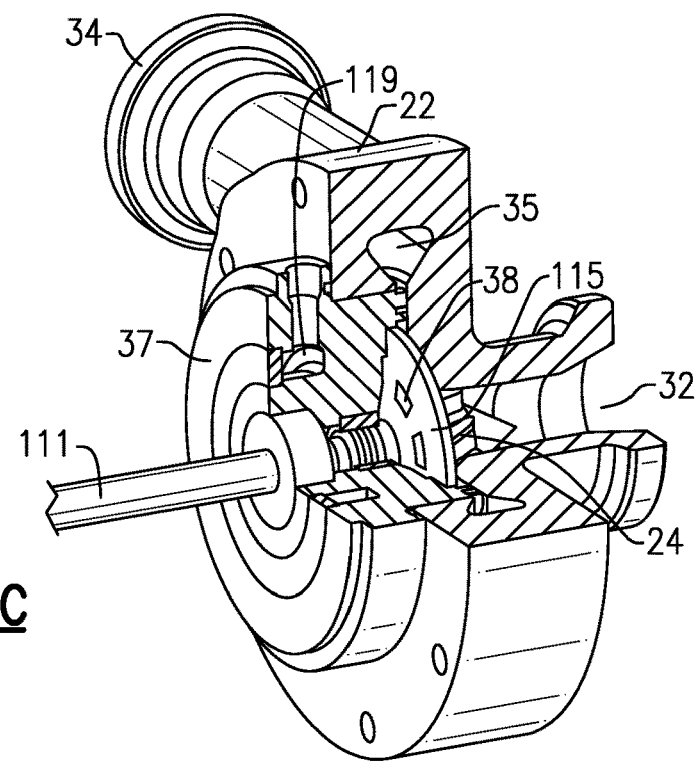
FIG. 1C shows a cutaway view of the rear of the turbine rotor in the housing.

FIG. 1C shows a rear surface 115 of the rotor 24. Cooling flow inlets 38 are shown in the rear surface 115. Shaft 111 rotates with the rotor. Cooling flow enters the housing 37 into chamber 119. The cooling flow may be obtained from a compressor or other appropriate source.

Figure 1D:
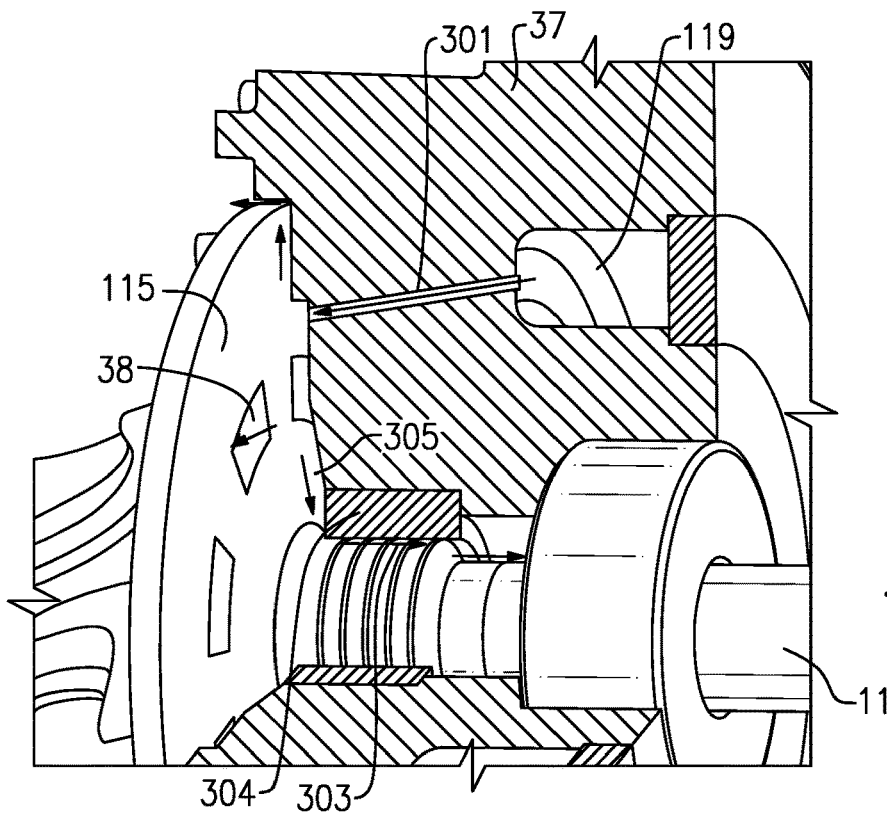
FIG. 1D shows details of cooling fluid flow through the housing and into the turbine rotor.

FIG. 1D shows details of the cooling fluid flow from the chamber 119 through impingement holes 301. As will be understood there are a plurality of such holes 301. The cooling fluid flows outwardly through a gap 305 between the rear side 115 and the housing 37 to form purge flow, which will not only prevent high temperature working fluid going inside but also form film cooling to cool the turbine. This cooling fluid also flows between the shaft 111 and to seal 304 as shown at 303. This provides cooling to the seal 304, and bearings, etc. associated with the shaft 111. The cooling flow also enters the plurality of inlets 38 in the rear surface 115.

The seal can be a labyrinth seal, a dry gas seal or other seal. There can be another cooling inlet immediately upstream of the seal to lower the temperature of the cooling flow through the seal.

FIG. 2A shows a cooling arrangement 100. FIGS. 2A-2E, 3A and 3B are "reverse views," showing the space occupied by the cooling fluid or coolant that are within a body of the turbine rotor as shown in FIGS. 1A and 1B. They are shown as coolant solid to simplify the illustration, and better illustrate the nature and shape of the cooling channels. Cooling flow is normally supplied from a compressor exit. Coolant temperature can be varied by a cooler or a heater if needed.

A feeder section 36 communicates with an inlet 38, and curves from an outer end 39 through a central portion 137 to an inner portion 35. The sections 39/137/35 change their direction similar to the way the blades and section 31 change, with the radially outer portion 39 extending with a greater component in a radial direction than in an axial direction. Section 137 extends with the two components being closer to equal. Section 35 extends with a greater component in an axial direction than in a radial direction.

As shown in FIG. 2B, an inner portion 42 is provided to cool the nose cone using backside impingement cooling. Section 35 feeds cooling flow to chamber 58 having a relatively large volume to provide relatively uniform feed pressure to impingement holes 56. The angle of the impingement holes 56 can be perpendicular or other angle to chamber 54. The spent cooling flow is then flowing through 55 to feed cooling passage 40

Cooling channel section 40 is generally provided to cool the sections 31 intermediate the blades 28. Here again, there is a radially outer section 11 curving into a central portion 101, and having a radially inner portion 27. These sections curve with a direction similar to the sections 31. That is, section 11 extends with a greater component in a radial direction than an axial direction. Section 15 has the two components being closer to being equal. Section 27 extends with a greater component in an axial than in a radial direction.

FIG. 2C shows details of the section 40. Here an inlet in a leg 55 receives cooling flow from 42. Cooling flow is received at leg 55, as will be disclosed, and the cooling flow extends radially outward to passage 53, and then back radially inward and then outward through other legs to leg 52. This radially inward and radially outward serpentine channel arrangement continues on until an end leg 44. At the end leg 44, there is potentially a flow dead zone, therefore, connection 45 is used to introduce cooling flow to purge the dead zone. Leg 44 is connected to section 41 through port 156, so that cooling flow can go from leg 44 to section 41 to cool the blades 28.

Section 41 is provided to cool the blades 28. It also has a radially outer section 13, a central section 15, and an inner section 103. These sections all curve in a manner similar to the blades. The outer section 13 extends with a greater component in a radial direction than in an axial direction. Central portion 15 extends with two components being closer to equal. Section 10 extends with a greater component in an axial direction than in a radial direction.

FIG. 2D shows the blade cooling portion 41. As shown, an inlet 156 provides cooling flow from the leg 44 (see FIGS. 2E and 3A). The cooling flow first cools the leading edge using impingement jets, as shown in FIG. 2E. The jets can target the center of leading edge, or the suction side of the lead edge. That cooling flow then extends in a serpentine path through repeated serpentine legs 158. As can be appreciated, the distance between the side legs 60 and 61 of the serpentine passages increases in axial height from the radially outer end through radially central portions 160 and 161, and two inner serpentine legs 260 and 261. The cooling flow then moves through holes 66 into a chamber 64 with pins, which cools the radially outer end of the blades 28. Finally, the cooling flow exits at the trailing edge of the turbine blades. The holes 66 can be also located at the trailing edge without chamber 64 and exit directly to turbine main flow stream.

Thus, the sections 40 have serpentine passages generally located under the turbine surface between blades while section 41 cools the blades.

The walls between the serpentine passages in sections 40 and 41 retain the strength of the rotor and reduce stresses.

Figure 3:
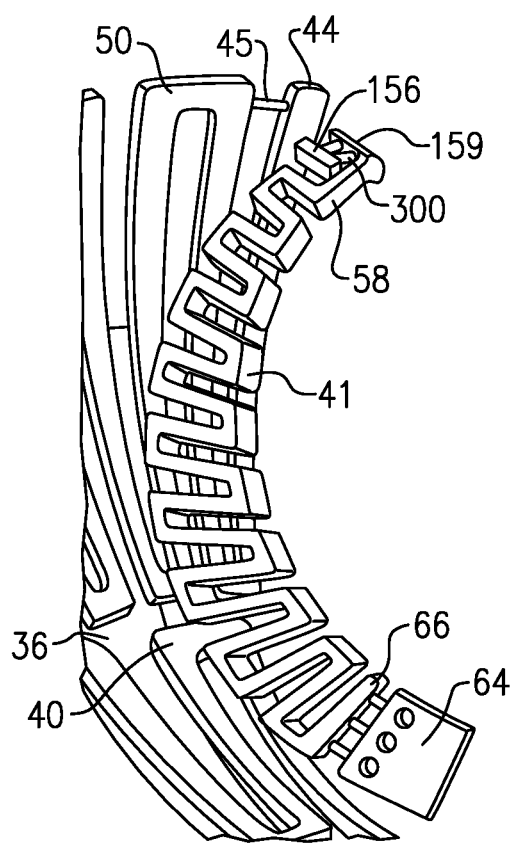
FIG. 3 shows further details of the combination of the several distinct cooling arrangements.

As shown in FIG. 3, the sections 41 are positioned axially forwardly of underlying sections 40. The sections 40 extend across the entire circumference of this rotor, as will be illustrated below.

Figure 4A:
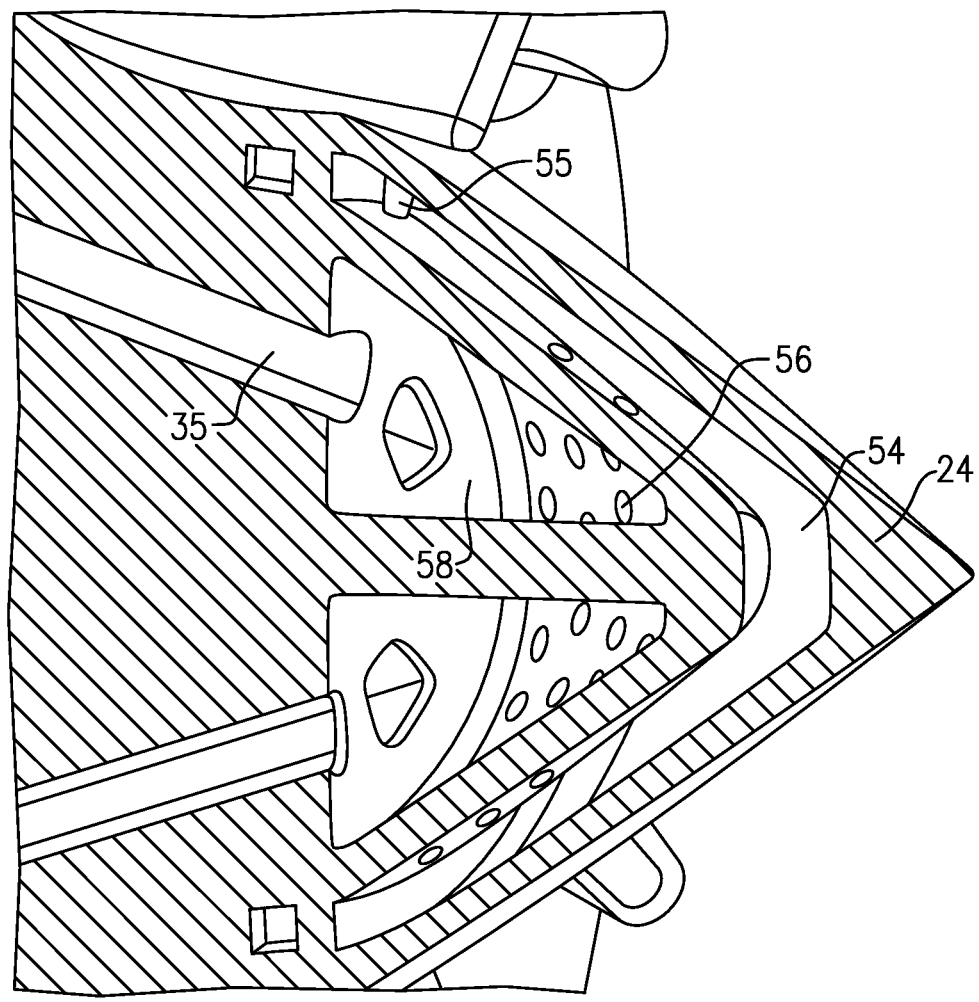
FIG. 4A is a cross section through a turbine rotor.

FIG. 4A shows details of the turbine 24 including the passages 35 delivering cooling fluid into the chamber 58, and then details of the passages 55 from the chamber 54.

FIG. 4B shows a leading edge 310 and a trailing edge 312 of a blade 28. The cooling flow, having cooled the blade, moves from the chamber 64 through a slot 314 to provide purge flow in the areas around the trailing edge 312.

FIG. 4C shows a detail of the slot 314.

FIG. 4D shows an alternative trailing edge 316 in which holes 318 replace the slot 314.

Figure 4E:
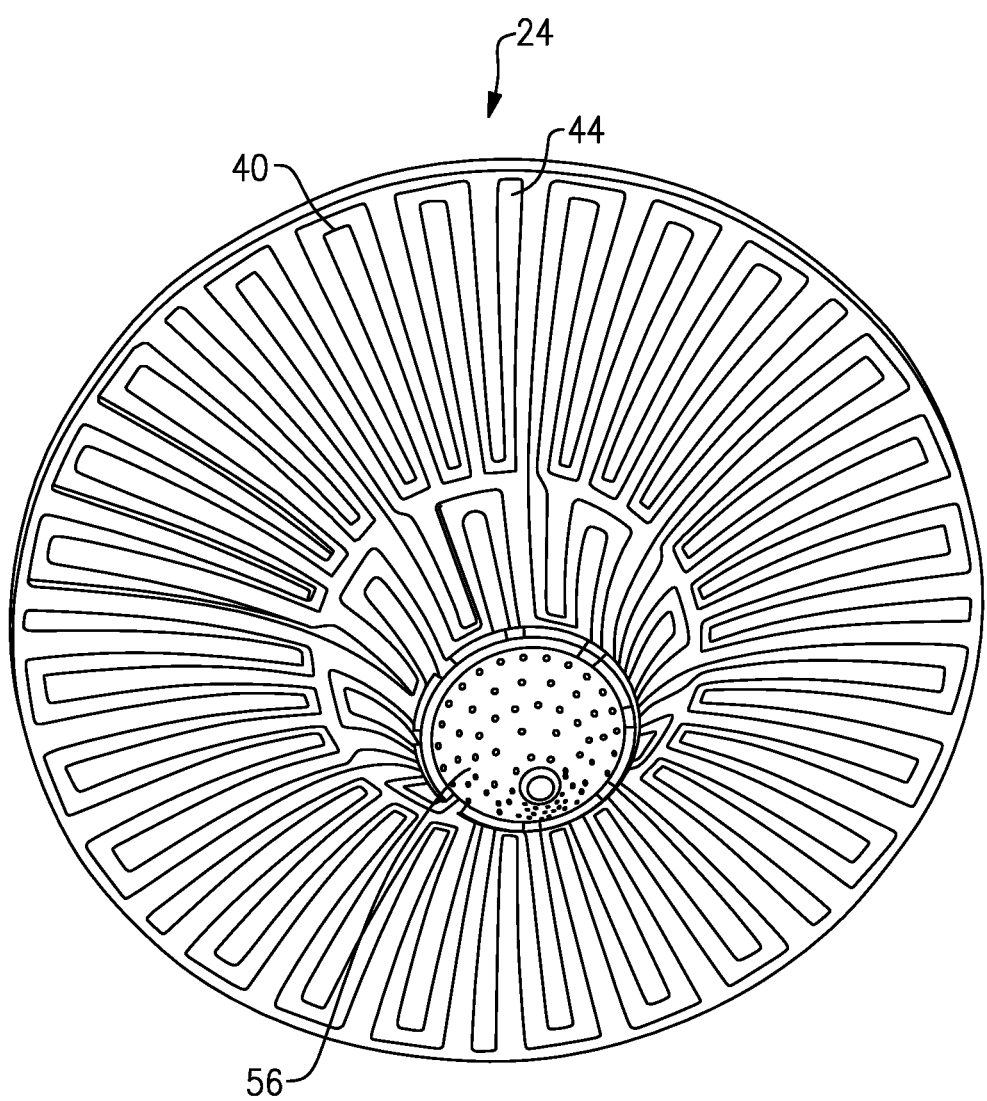
FIG. 4E shows details of some of the cooling air channels in the turbine rotor.

FIG. 4E shows a portion of the cooling arrangement in the rotor 24. As can be appreciated there are impingement cooling holes 56 in the nose cone, and the base cooling sections 40 surround the entire circumference of the rotor 24. Each section 40 has a passage 156, not illustrated, communicating to a blade cooling section 41.

As discussed above, it would be difficult to form the complex cooling channel arrangements of this disclosure with conventional machining.

Figure 5:
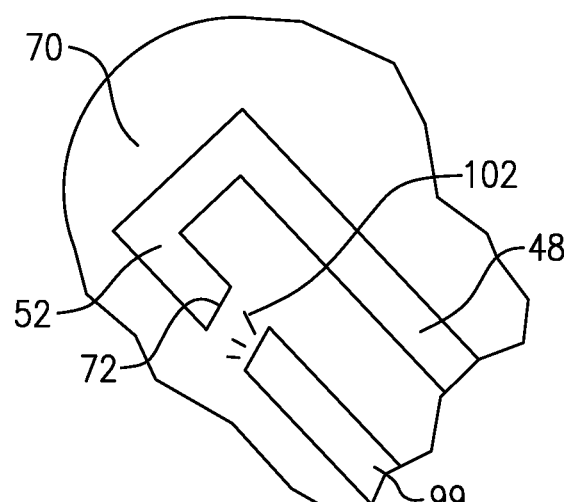
FIG. 5 schematically shows a method of forming a turbine rotor as disclosed.

FIG. 5 schematically shows a method of forming cooling channels in the rotor utilizing additive manufacturing. A section 48/52 of these channels is shown being formed into an intermediate rotor portion 70. An end 72 of the channel 52 has been closed off.

Additive manufacturing tool 99 is shown depositing powder material 102, which is then activated by a laser to become solid.

A turbine rotor according to this disclosure could be said to have a base, with a plurality of blades extending radially outwardly of the base. A central nose is radially inward of the blades, and defines a central axis of rotation. The base and the blades curve such that radially outward portions of the base and the blades extend in a direction with a greater component in a radial direction than in an axial direction. Radially central portions of the base and the blades extend in a direction with the two components being closer to each other. Radially inner sections of the base and the blades extending in a direction with a greater component in the axial direction than in a radial direction. There is a cooling channel arrangement in the turbine rotor. The cooling channel arrangement including impingement cooling of the nose, serpentine passages for cooling sections of the base circumferentially intermediate the blades, and distinct serpentine passages for cooling the plurality of blades.

A method according to this disclosure could be said to include the steps using additive manufacturing to form a turbine rotor having cooling channels by laying down layers to form a base. A plurality of blades are formed extending radially outwardly of the base. A central nose is formed radially inward of the blades, and the central nose defining a central axis of rotation. The base and the blades are formed to be curving such that radially outward portions of the base and the blades extend in a direction with a greater component in a radial direction than in an axial direction. Radially central portions of the base and the blades extend in a direction with the two components being closer to each other, and radially inner sections of the base and the blades extend in a direction with a greater component in the axial direction than in a radial direction. A cooling channel arrangement is formed in the turbine rotor, the cooling channel arrangement including serpentine passages for cooling sections of the base circumferentially intermediate the blades, and distinct serpentine passages for cooling the plurality of blades.

The cooling fluid may be the same fluid as the turbine working fluid of it could be a different fluid. The cooling fluid may be air, $CO_2$, supercritical $CO_2$ or other fluids.

Although an embodiment has been disclosed, a worker of ordinary skill in this art would recognize that certain modifications could come within the scope of this disclosure. For example, the order of cooling flow path to the nose, and sections 40 and 41 can be reversed, or otherwise changed. For these reasons, the following claims should be studied to determine the true scope and content of this disclosure.

What is claimed is:

1. A turbine rotor comprising:
   a base, with a plurality of blades extending radially outwardly of the base, and a central nose radially inward of the blades, and the central nose defining a central axis of rotation;
   the base and the blades curving such that radially outward portions of the base and the blades extend in a direction with a greater component in a radial direction than in an axial direction, and radially central portions of the base and the blades extend in a direction with the two components being closer to each other, and radially inner sections of the base and the blades extending in a direction with a greater component in the axial direction than in a radial direction; and
   there being a cooling channel arrangement in the turbine rotor, the cooling channel arrangement including impingement cooling of the central nose and serpentine passages for cooling sections of the base circumferentially intermediate the blades, and distinct serpentine passages for cooling the plurality of blades.

2. The turbine rotor as set forth in claim 1, wherein serpentine passages cooling the section of the base between the blades extends around an entire circumference of the base, and is also provided axially beneath the serpentine passages for cooling the plurality of blades.

3. The turbine rotor as set forth in claim 2, wherein the serpentine passages cooling the sections of the base between the blades have a first leg extending radially inwardly to an end, and communicating into a second leg extending radially outwardly to an outer end, and the first and second legs being circumferentially spaced.

4. The turbine rotor as set forth in claim 3, wherein the serpentine passages cooling the blades have a first leg extending axially towards said the central nose to an end, and then a second leg extending axially away from said the central nose to a second end, such that the serpentine passages cooling the sections of the base between the blades extends in a direction that is different than a direction of the serpentine passages cooling the blades.

5. The turbine rotor as set forth in claim 4, wherein a feeder section receives cooling flow, and provides the cooling flow into a first chamber, the first chamber associated with impingement holes to provide the cooling flow into a second chamber at the central nose to provide the impingement cooling of the central nose.

6. The turbine rotor as set forth in claim 5, wherein cooling flow from the second chamber communicates into the serpentine passages for cooling sections of the base circumferentially intermediate the blades.

7. The turbine rotor as set forth in claim 6, wherein the serpentine channels cooling the blade receives the cooling flow from an inlet associated with the serpentine channels cooling the sections of the base between the blades.

8. The turbine rotor as set forth in claim 1, wherein the serpentine passages cooling the sections of the base between the blades have a first leg extending radially inwardly to an end, and then a second leg extending radially outwardly to an outer end, and the first and second legs being circumferentially spaced.

9. The turbine rotor as set forth in claim 8, wherein the serpentine passages cooling the blades have a first leg extending axially towards the central nose to an end, and then a second leg extending axially away from the central nose to a second end, such that the serpentine passages cooling the sections of the base between the blades extends in a direction that is different than a direction of the serpentine passages cooling the blades.

10. The turbine rotor as set forth in claim 9, wherein a feeder section receives cooling flow, and provides the cooling flow into a first chamber, the first chamber associated with impingement holes to provide the cooling flow into a second chamber at the central nose to provide the impingement cooling of said central nose.

11. The turbine rotor as set forth in claim 10, wherein cooling flow from the second chamber communicates with the serpentine passages for cooling sections of the base circumferentially intermediate the blades.

12. The turbine rotor as set forth in claim 11, wherein the serpentine passages for cooling the section of the base intermediate the blades has a downstream most leg including holes for communicating flow into the serpentine passages for cooling the plurality of blades.

13. The turbine rotor as set forth in claim 12, wherein the downstream most leg of the serpentine passages for cooling the sections of the base intermediate the blades communicates with an upstream leg to provide additional cooling air into the downstream most leg.

14. The turbine rotor as set forth in claim 1, wherein cooling fluid at a downstream end of the serpentine passages for cooling the blades passes outwardly through outlets in a trailing edge of each of the plurality of blades to provide film cooling.

15. The turbine rotor as set forth in claim 1, wherein the turbine rotor is formed by additive manufacturing.

16. A turbomachine comprising:
a turbine rotor have a base, with a plurality of blades extending radially outwardly of the base, and a central nose radially inward of the blades, and the central nose defining a central axis of rotation, the base and the blades curving such that radially outward portions of the base and the blades extend in a direction with a greater component in a radial direction than in an axial direction, and radially central portions of the base and the blades extend in a direction with the two components being closer to each other, and radially inner sections of the base and the blades extending in a direction with a greater component in the axial direction than in a radial direction, there being a cooling channel arrangement in the turbine rotor, the cooling channel arrangement including impingement cooling of the central nose and serpentine passages for cooling sections of the base circumferentially intermediate the blades, and distinct serpentine passages for cooling the plurality of blades; and
a housing the turbine rotor, the turbine rotor having a shaft mounted in the housing, and the turbine rotor having a rear face spaced from a face of the housing by a gap.

17. The turbomachine as set forth in claim 16, wherein cooling fluid passes from the housing into inlets in the rear face of the turbine rotor.

18. The turbomachine as set forth in claim 17, wherein the cooling fluid from the housing further passing into a second gap between the housing and an outer surface of the shaft to cool a seal.

19. The turbomachine as set forth in claim 18, wherein cooling fluid at a downstream end of the serpentine passages for cooling the plurality of blades passes outwardly through outlets in a trailing edge of each of the plurality of blades to provide film cooling.

20. A method comprising:
using additive manufacturing to form a turbine rotor having cooling channels by laying down layers to form a base, with a plurality of blades formed extending radially outwardly of the base, and a central nose formed radially inward of the blades, and the central nose defining a central axis of rotation;
the base and the blades formed to be curving such that radially outward portions of the base and the blades extend in a direction with a greater component in a radial direction than in an axial direction, and radially central portions of the base and the blades extend in a direction with the two components being closer to each other, and radially inner sections of the base and the blades extending in a direction with a greater component in the axial direction than in a radial direction; and
there being a cooling channel arrangement formed in the turbine rotor, the cooling channel arrangement including serpentine passages for cooling sections of the base circumferentially intermediate the blades, and distinct serpentine passages for cooling the plurality of blades.

* * * * *